(12) United States Patent
Hsu et al.

(10) Patent No.: US 11,479,498 B2
(45) Date of Patent: Oct. 25, 2022

(54) GLASS COMPOSITION AND GLASS FIBER HAVING THE SAME

(71) Applicant: FULLTECH FIBER GLASS CORP., Douliu (TW)

(72) Inventors: Wen-Ho Hsu, Douliu (TW); Bih-Cherng Chern, Douliu (TW); Chih-Yuan Chang, Douliu (TW); Yueh-Heng Lee, Douliu (TW); Wei-Chih Lo, Douliu (TW)

(73) Assignee: FULLTECH FIBER GLASS CORP., Douliu (TW)

( * ) Notice: Subject to any disclaimer, the term of this patent is extended or adjusted under 35 U.S.C. 154(b) by 48 days.

(21) Appl. No.: 17/100,347

(22) Filed: Nov. 20, 2020

(65) Prior Publication Data
US 2021/0206687 A1    Jul. 8, 2021

(30) Foreign Application Priority Data

Dec. 31, 2019    (TW) .................................. 108148665

(51) Int. Cl.
| | |
|---|---|
| *C03C 3/093* | (2006.01) |
| *C03C 13/06* | (2006.01) |
| *C03C 3/087* | (2006.01) |
| *C03C 3/095* | (2006.01) |
| *C03C 3/112* | (2006.01) |

(52) U.S. Cl.
CPC .............. *C03C 3/087* (2013.01); *C03C 3/095* (2013.01); *C03C 3/112* (2013.01)

(58) Field of Classification Search
CPC .......... C03C 13/00; C03C 13/06; C03C 3/093
See application file for complete search history.

(56) References Cited

U.S. PATENT DOCUMENTS

| | | | |
|---|---|---|---|
| 10,479,721 B2* | 11/2019 | Li | ........................... C03C 13/00 |
| 2018/0127305 A1* | 5/2018 | Li | ........................... C03C 13/00 |
| 2020/0039870 A1* | 2/2020 | Li | ........................... C03C 13/00 |

FOREIGN PATENT DOCUMENTS

CN    1903767 A    1/2007

OTHER PUBLICATIONS

Search Report appended to an Office Action, which was issued to Taiwanese counterpart application No. 108148665 by the TIPO dated Feb. 20, 2020, with an English translation thereof (2 pages).

* cited by examiner

*Primary Examiner* — Karl E Group
(74) *Attorney, Agent, or Firm* — Hamre, Schumann, Mueller & Larson, P.C.

(57) ABSTRACT

Disclosed herein is a glass composition that includes, based on the total weight of the composition, 52 wt % to 58 wt % of $SiO_2$, 12 wt % to 16 wt % of $Al_2O_3$, 16 wt % to 26 wt % of $B_2O_3$, greater than 0 wt % and not greater than 2 wt % of MgO, 1 wt % to 6 wt % of CaO, greater than 1 wt % and lower than 5 wt % of $TiO_2$, greater than 0 wt % and not greater than 0.6 wt % of $Na_2O$, 0 wt % to 0.5 wt % of $K_2O$, 0 wt % to 1 wt % of $F_2$, 1 wt % to 5 wt % of ZnO, greater than 0 wt % and not greater than 1 wt % of $Fe_2O_3$; and 0.1 wt % to 0.6 wt % of $SO_3$. Also disclosed herein is a glass fiber including the glass composition.

9 Claims, No Drawings

GLASS COMPOSITION AND GLASS FIBER HAVING THE SAME

CROSS-REFERENCE TO RELATED APPLICATION

This application claims priority of Taiwanese Invention Patent Application No. 108148665, filed on Dec. 31, 2019.

FIELD

The disclosure relates to a glass composition and a glass fiber including the same. More particular, the glass fiber made from the glass composition has a low dielectric constant, a low dielectric loss tangent, and a reduced number of bubbles, and is suitable for use in reinforcing printed circuit boards.

BACKGROUND

Due to the rapid development of various electronic information devices (such as a 4G or 5G mobile phone and a personal digital assistant), a glass fiber used in a printed circuit board is required to have a low dielectric constant (Dk) and a low dielectric loss tangent (also known as dissipation factor, Df), so as to make the printed circuit board have a faster propagation speed and a lower propagation loss. In the production of a glass fiber for a printed circuit board, a glass composition called E glass is conventionally used. However, E glass has a relatively high dielectric constant ranging from 6.5 to 7.0, and yields relatively high dielectric losses. Therefore, E-glass is a poor reinforcement material for printed circuit boards (PCBs) having higher densities of electronic components and higher processing speeds.

Alternative glass fiber compositions are available, including D and S glass. These glasses have a low Dk, but have a high melting temperature and a high viscosity, making it difficult to eliminate bubbles in the glass melt. These bubbles, if small, remain through the glass fiber forming process and result in hollow glass fibers. If large, these bubbles cause an interruption in the process. Therefore, such disadvantageous bubbles and hollow glass fibers are to be avoided in glass fiber production.

Conductive anodic filament (CAF) formation may occur when ions, particularly residual ions (such as copper ions) from the electroless plating process, travel along an originally insulating hollow glass fiber to form a conductive path. CAF formation causes a number of reliability issues (such as current leakage and intermittent electrical shorts) and might result in catastrophic failure of PCBs, which in some instances might cause fires.

SUMMARY

Therefore, a first object of the disclosure is to provide a glass composition that can alleviate at least one of the drawbacks of the prior art.

The glass composition includes, based on the total weight of the composition:
  52 wt % to 58 wt % of $SiO_2$;
  12 wt % to 16 wt % of $Al_2O_3$;
  16 wt % to 26 wt % of $B_2O_3$;
  greater than 0 wt % and not greater than 2 wt % of MgO;
  1 wt % to 6 wt % of CaO;
  greater than 1 wt % and lower than 5 wt % of $TiO_2$;
  greater than 0 wt % and not greater than 0.6 wt % of $Na_2O$;
  0 wt % to 0.5 wt % of $K_2O$;
  0 wt % to 1 wt % of $F_2$;
  1 wt % to 5 wt % of ZnO;
  greater than 0 wt % and not greater than 1 wt % of $Fe_2O_3$; and
  0.1 wt % to 0.6 wt % of $SO_3$.

A second object of the disclosure is to provide a glass fiber including a glass composition as described above, which can alleviate at least one of the drawbacks of the prior art.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some aspects ±100%, in some aspects ±50%, in some aspects ±20%, in some aspects ±10%, in some aspects ±5%, in some aspects ±1%, in some aspects ±0.5%, and in some aspects ±0.1% from the specified amount, as such variations are appropriate to perform the disclosed methods or employ the disclosed compositions.

The present disclosure provides a glass composition, including, based on the total weight of the composition:
  52 wt % to 58 wt % of $SiO_2$;
  12 wt % to 16 wt % of $Al_2O_3$;
  16 wt % to 26 wt % of $B_2O_3$;
  greater than 0 wt % and not greater than 2 wt % of MgO;
  1 wt % to 6 wt % of CaO;
  greater than 1 wt % and lower than 5 wt % of $TiO_2$;
  greater than 0 wt % and not greater than 0.6 wt % of $Na_2O$;
  0 wt % to 0.5 wt % of $K_2O$;
  0 wt % to 1 wt % of $F_2$;
  1 wt % to 5 wt % of ZnO;

greater than 0 wt % and not greater than 1 wt % of $Fe_2O_3$; and 0.1 wt % to 0.6 wt % of $SO_3$.

According to the present disclosure, $SiO_2$ is a main component of the glass composition. As $SiO_2$ is present in an amount ranging from 52 wt % to 58 wt %, the glass composition may have an appropriate viscosity when it is melted, which is advantageous for manufacturing a glass fiber by spinning. The glass fiber formed from the glass composition may have a dielectric constant of less than 5 and an improved mechanical strength, such that it is not easy to break during a drilling process. Further, the glass fiber formed from the glass composition has a good water resistance and an acid resistance, and thus can improve the stability of a printed circuit board.

As $Al_2O_3$ is present in an amount ranging from 12 wt % to 16 wt %, $Al_2O_3$ is effective in suppressing crystallization phenomenon and occurrence of phase separation in molten glass. In addition, the glass composition can have a low melting temperature and a low viscosity when it is melted, which is advantageous for manufacturing the glass fiber by spinning.

According to the present disclosure, $B_2O_3$ is used as a fluxing agent, which can reduce the viscosity of molten glass. In addition, $B_2O_3$ is a low-dielectric oxide, which can reduce non-bridging oxygen bonds in the glass fiber, thereby is able to reduce the dielectric constant and dielectric loss tangent of the glass fiber.

As $B_2O_3$ is present in an amount ranging from 16 wt % to 26 wt %, the glass fiber can have a good water resistance, so that the glass cloth formed by the glass fiber would not be corroded and form holes during the wet procedures in printed circuit board manufacturing processes, and thus has a high adhesion to prepreg materials (such as resin).

In certain embodiments, $B_2O_3$ is present in an amount ranging from 16 wt % to 24 wt %, based on the total weight of the composition.

As MgO is present in an amount greater than 0 wt % and not greater than 2 wt %, MgO is effective in suppressing crystallization phenomenon and occurrence of phase separation in molten glass. In addition, the glass composition can have a low viscosity when it is melted, which is advantageous for manufacturing the glass fiber by spinning. As a result, the glass fiber formed by the glass composition can have a low dielectric constant, an improved water resistance and chemical stability, and can inhibit the presence of cordierite crystals.

As CaO is present in an amount ranging from 1 wt % to 6 wt %, the glass composition can have a low viscosity when it is melted, which is advantageous for manufacturing the glass fiber by spinning. In addition, the glass fiber formed by the glass composition can have a low dielectric constant and an improved water resistance and chemical stability.

As $TiO_2$ is present in an amount greater than 1 wt % and lower than 5 wt %, the glass composition can be easily melted into molten glass, and the molten glass thus obtained has a low viscosity, which is advantageous for manufacturing the glass fiber having a low dielectric constant and less bubbles.

In certain embodiments, $TiO_2$ is present in an amount greater than 1 wt % and not greater than 3 wt %, based on the total weight of the composition.

According to the present disclosure, $Na_2O$ is used as a fluxing agent. As $Na_2O$ is present in an amount greater than 0 wt % and not greater than 0.6 wt %, the glass composition can be easily melted into molten glass, and the glass fiber formed from the glass composition can have a low dielectric constant and an improved water resistance.

According to the present disclosure, $K_2O$ is used as a fluxing agent. As $K_2O$ is present in an amount ranging from 0 wt % to 0.5 wt %, the glass composition can be easily melted into molten glass, and the glass fiber formed from the glass composition can have a low dielectric constant and an improved water resistance.

According to the present disclosure, $F_2$ is used as a fluxing agent. As $F_2$ is present in an amount ranging from 0 wt % to 1 wt %, $F_2$ is effective in suppressing crystallization phenomenon and occurrence of phase separation in molten glass. In addition, the glass composition can be easily melted into molten glass, and the molten glass thus obtained has a low viscosity, which is advantageous for manufacturing the glass fiber by spinning.

In certain embodiments, $F_2$ is present in an amount greater than 0 wt % and not greater than 1 wt %, based on the total weight of the composition.

As ZnO is present in an amount ranging from 1 wt % to 5 wt %, the glass composition can have a low viscosity and less bubbles when it is melted, and $\Delta T$, which is defined as the difference between the forming temperature at which the molten glass has a viscosity of 1000 poise and the devitrification temperature, can be increased, which is advantageous for manufacturing the glass fiber by spinning.

In certain embodiments, ZnO is present in an amount ranging from 2 wt % to 4 wt %, based on the total weight of the composition.

As $Fe_2O_3$ is present in an amount greater than 0 wt % and not greater than 1 wt %, the redox degree of the glass composition can be observed by the redox state of iron, which is advantageous for adjusting the redox atmosphere of the molten glass and reducing the dielectric constant of the glass fiber.

As $SO_3$ is present in an amount ranging from 0.1 wt % to 0.6 wt %, the thickness of the foam layer produced during the melting of the glass composition is reduced, which improves the heat transfer efficiency in the glass furnace and helps reduce the number of bubbles in the glass fiber.

In certain embodiments, $SO_3$ is present in an amount ranging from 0.1 wt % to 0.3 wt %, based on the total weight of the composition.

According to the present disclosure, the glass composition is free from rare earth elements.

According to the present disclosure, the glass composition may further include an additional component selected from the group consisting of $Li_2O$, $Cr_2O_3$, $As_2O_3$, $Sb_2O_3$, $P_2O_5$, $ZrO_2$, $Cl_2$, BeO, SrO, and combinations thereof.

In certain embodiments, the additional component is present in an amount not greater than 3 wt %, based on the total weight of the glass composition.

According to the present disclosure, the glass composition may have a good forming window, due to the combination of all the required components (particularly, $TiO_2$, ZnO, and $SO_3$) and the required contents of these components in the glass composition, and the glass fiber formed by the glass composition has a low dielectric constant, a low dielectric tangent loss, and a low number of bubbles, thereby reducing the incidence of short circuit in a printed circuit board and crystallization phenomenon.

The disclosure will be further described by way of the following examples. However, it should be understood that the following examples are solely intended for the purpose of illustration and should not be construed as limiting the disclosure in practice.

1. Preparation of Glass Composition and Glass Specimen

Regarding each of three examples (i.e., examples 1 to 3) and six comparative examples (i.e., comparative examples 1 to 6), a glass composition was prepared using the corresponding recipe shown in Table 1, and was used to prepare a glass specimen.

Specifically, all the ingredients listed in the respective recipe shown in Table 1 were evenly mixed to obtain the corresponding glass composition. The glass composition was heated in a high temperature furnace at 1500° C. to 1550° C. for 4 to 6 hours. The resultant molten glass was poured into a graphite crucible having a diameter of 40 mm, and the graphite crucible was then placed in an annealing furnace preheated to 800° C. The molten glass was allowed to cool to room temperature, so as to form a glass block. Thereafter, the glass block was ground and polished to obtain the corresponding glass specimen having a thickness of 1 to 1.5 mm.

TABLE 1

| | Example | | | Comparative example | | | | | |
|---|---|---|---|---|---|---|---|---|---|
| | 1 | 2 | 3 | 1 | 2 | 3 | 4 | 5 | 6 |
| Ingredients | | | | Content (wt %)[a] | | | | | |
| $SiO_2$ | 54.8 | 54.8 | 55.5 | 55.5 | 55.5 | 55.1 | 55.0 | 56.4 | 56.1 |
| $Al_2O_3$ | 13.5 | 15.5 | 14.0 | 14.0 | 14.0 | 14.2 | 15.0 | 15.5 | 15.4 |
| $B_2O_3$ | 20.0 | 19.1 | 18.4 | 20.0 | 19.0 | 20.0 | 19.0 | 17.0 | 16.4 |
| MgO | 2.0 | 0.9 | 1.5 | 1.5 | 0.4 | 1.8 | 0.4 | 1.8 | 1.8 |
| CaO | 3.5 | 4.5 | 2.5 | 3.5 | 1.6 | 5.7 | 1.6 | 4.5 | 4.5 |
| $TiO_2$ | 1.2 | 1.2 | 3.0 | 0.6 | 5.5 | 1.2 | 1.5 | 1.2 | 1.2 |
| $Na_2O$ | 0.3 | 0.3 | 0.3 | 0.3 | 0.3 | 0.3 | 0.3 | 0.1 | 0.6 |
| $K_2O$ | 0.0 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 | 0.0 |
| $F_2$ | 0.7 | 0.7 | 0.7 | 0.7 | 0.7 | 0.7 | 0.7 | 0.7 | 0.7 |
| ZnO | 3.5 | 2.5 | 3.5 | 3.5 | 2.5 | 0.5 | 6.0 | 2.5 | 2.5 |
| $Fe_2O_3$ | 0.2 | 0.3 | 0.2 | 0.2 | 0.2 | 0.2 | 0.2 | 0.3 | 0.3 |
| $SO_3$ | 0.3 | 0.3 | 0.3 | 0.3 | 0.3 | 0.3 | 0.3 | 0.0 | 0.7 |

[a]The percentage of the respective ingredient is the weight percentage relative to the total weight of the corresponding glass composition.

2. Characteristic Analysis of Glass Composition and Glass Specimen

In order to determine the glass fiber forming properties, the glass composition and glass specimen of the respective one of examples 1 to 3 and comparative examples 1 to 6 obtained in Section 1 were subjected to the following analyses.

A. Measurement of Number of Bubbles 5 g of the respective glass composition was heated in a high temperature furnace at 1500° C. for 1.5 hours. The resultant molten glass was placed in an annealing furnace preheated to 800° C. The molten glass was allowed to cool to room temperature, so as to form a glass block. Thereafter, a square region having an area of 64 mm² in the center of the glass block was selected to calculate the number of bubbles contained in the square region.

B. Measurement of Dielectric Constant (Dk) and Dielectric Loss Tangent (Df)

The dielectric constant and dielectric loss tangent of the respective glass specimen were measured at a frequency of 1 MHz using a precision impedance analyzer (4294A, Agilent Technologies Co., Ltd.) in accordance with ASTM Test Method D150.

C. Measurement of Devitrification Temperature 2.25 g of the respective glass composition was heated in a high temperature furnace at a predetermined temperature for 16 hours. Thereafter, the resultant molten glass was taken out from the high temperature furnace, followed by cooling to room temperature, so as to form a glass block.

The crystallization phenomenon in the glass block was visually observed. If crystals were present in the glass block, the predetermined temperature was the devitrification temperature. The difference (ΔT) between the forming temperature and the devitrification temperature was also determined.

Results:

As shown in Table 2 below, when the glass composition included greater than 1 wt % and lower than 5 wt % of $TiO_2$, 1 wt % to 5 wt % of ZnO, and 0.1 wt % to 0.6 wt % of $SO_3$, based on the total weight of the glass composition, the resultant glass block had a low number of bubbles (see examples 1 to 3). In contrast, when the glass composition included lower than 1 wt % or greater than 5 wt % of $TiO_2$, lower than 1 wt % or greater than 5 wt % of ZnO, and lower than 0.1 wt % or greater than 0.6 wt % of $SO_3$, based on the total weight of the glass composition, the resultant glass block had a large number of bubbles (see comparative examples 1, 3, 5, and 6). These results indicate that the glass fiber formed from the glass composition of the present disclosure has a low number of bubbles, and hence is capable of reducing the incidence of short circuit in a printed circuit board.

In addition, the ΔT values determined for the glass compositions of examples 1 to 3 were higher than those determined for the glass compositions of comparative examples 2 and 4, indicating that the glass composition of the present disclosure has a good forming window.

Summarizing the above test results, it is clear that the glass composition of the present disclosure has a good forming window, due to the combination of all the required components (particularly, $TiO_2$, ZnO, and $SO_3$) and the required contents of these components in the glass composition, and the glass fiber formed by the glass composition has a low dielectric constant, a low dielectric tangent loss, and a low number of bubbles, thereby reducing the incidence of short circuit in a printed circuit board and crystallization phenomenon.

TABLE 2

| | Example | | | Comparative example | | | | | |
|---|---|---|---|---|---|---|---|---|---|
| | 1 | 2 | 3 | 1 | 2 | 3 | 4 | 5 | 6 |
| Number of bubbles | 54 | 71 | 70 | 106 | —[a] | 136 | — | 115 | 110 |
| Dk (1 MHz) | 4.90 | 4.76 | 4.84 | 4.83 | 4.80 | 4.96 | 4.82 | 4.91 | 4.84 |
| Df (1 MHz) | <0.001 | 0.002 | 0.002 | <0.001 | 0.002 | 0.002 | 0.002 | 0.001 | 0.001 |
| Forming temperature (° C.) | 1333 | 1329 | 1333 | 1343 | 1347 | 1328 | 1339 | 1343 | 1346 |

TABLE 2-continued

| | Example | | | Comparative example | | | | | |
|---|---|---|---|---|---|---|---|---|---|
| | 1 | 2 | 3 | 1 | 2 | 3 | 4 | 5 | 6 |
| Devitrification temperature (° C.) | <1250 | <1250 | <1250 | <1250 | 1350 | <1250 | 1350 | <1250 | <1250 |
| ΔT[b] (° C.) | >50 | >50 | >50 | >50 | <0 | >50 | <0 | >50 | >50 |

[a]The glass block was not transparent such that the bubbles could not be measured.
[b]The difference between the forming temperature and the devitrification temperature.

All patents and references cited in this specification are incorporated herein in their entirety as reference. Where there is conflict, the descriptions in this case, including the definitions, shall prevail.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A glass composition comprising, based on the total weight of the composition:
   52 wt % to 58 wt % of $SiO_2$;
   12 wt % to 16 wt % of $Al_2O_3$;
   16 wt % to 26 wt % of $B_2O_3$;
   greater than 0 wt % and not greater than 2 wt % of MgO;
   1 wt % to 6 wt % of CaO;
   greater than 1 wt % and lower than 5 wt % of $TiO_2$;
   greater than 0 wt % and not greater than 0.6 wt % of $Na_2O$;
   0 wt % to 0.5 wt % of $K_2O$;
   0 wt % to 1 wt % of $F_2$;
   1 wt % to 5 wt % of ZnO;
   greater than 0 wt % and not greater than 1 wt % of $Fe_2O_3$; and
   0.1 wt % to 0.6 wt % of $SO_3$.

2. The glass composition according to claim 1, wherein $TiO_2$ is present in an amount greater than 1 wt % and not greater than 3 wt %.

3. The glass composition according to claim 1, wherein ZnO is present in an amount ranging from 2 wt % to 4 wt %.

4. The glass composition according to claim 1, wherein $SO_3$ is present in an amount ranging from 0.1 wt % to 0.3 wt %.

5. The glass composition according to claim 1, wherein $B_2O_3$ is present in an amount ranging from 16 wt % to 24 wt %.

6. The glass composition according to claim 1, wherein $F_2$ is present in an amount greater than 0 wt % and not greater than 1 wt %.

7. The glass composition according to claim 1, which is free from rare earth elements.

8. The glass composition according to claim 1, further comprising a component selected from the group consisting of $Li_2O$, $Cr_2O_3$, $As_2O_3$, $Sb_2O_3$, $P_2O$, $ZrO_2$, $Cl_2$, BeO, SrO, and combinations thereof.

9. A glass fiber comprising a glass composition as claimed in claim 1.

* * * * *